US011548969B2

(12) United States Patent
Brahm et al.

(10) Patent No.: US 11,548,969 B2
(45) Date of Patent: Jan. 10, 2023

(54) PROCESS FOR THE PREPARATION OF POLYISOCYANATES WITH DIMER, TRIMER AND/OR ALLOPHANATE AND OPTIONALLY URETHANE STRUCTURE

(71) Applicant: Covestro Intellectual Property GmbH & Co. KG, Leverkusen (DE)

(72) Inventors: Martin Brahm, Odenthal (DE); Dieter Mager, Leverkusen (DE); Frank Richter, Leverkusen (DE); Jingchun Qian, Shanghai (CN)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/599,598

(22) PCT Filed: Apr. 2, 2020

(86) PCT No.: PCT/EP2020/059375
§ 371 (c)(1),
(2) Date: Sep. 29, 2021

(87) PCT Pub. No.: WO2020/207892
PCT Pub. Date: Oct. 15, 2020

(65) Prior Publication Data
US 2022/0144995 A1 May 12, 2022

(30) Foreign Application Priority Data

Apr. 10, 2019 (WO) ............... PCT/CN2019/082029
Apr. 30, 2019 (EP) ..................................... 19171784

(51) Int. Cl.
| | |
|---|---|
| *C08G 18/02* | (2006.01) |
| *C08G 18/18* | (2006.01) |
| *C08G 18/28* | (2006.01) |
| *C08G 18/73* | (2006.01) |
| *C08G 18/75* | (2006.01) |
| *C08G 18/78* | (2006.01) |
| *C08G 18/79* | (2006.01) |
| *C08K 5/521* | (2006.01) |

(52) U.S. Cl.
CPC ......... *C08G 18/022* (2013.01); *C08G 18/027* (2013.01); *C08G 18/1816* (2013.01); *C08G 18/2825* (2013.01); *C08G 18/73* (2013.01); *C08G 18/755* (2013.01); *C08G 18/7831* (2013.01); *C08G 18/7837* (2013.01); *C08G 18/792* (2013.01); *C08G 18/798* (2013.01); *C08K 5/521* (2013.01); *C08G 2115/02* (2021.01)

(58) Field of Classification Search
CPC ............... C08G 18/022; C08G 18/027; C08G 18/1816; C08G 18/2825; C08G 18/73; C08G 18/755; C08G 18/7831; C08G 18/7837; C08G 18/792; C08G 18/798; C08G 2115/02; C08K 5/521
See application file for complete search history.

(56) References Cited

U.S. PATENT DOCUMENTS

| | | |
|---|---|---|
| 5,158,922 A | 10/1992 | Hinney et al. |
| 5,470,813 A | 11/1995 | Le-Khac |
| 5,589,431 A | 12/1996 | Le-Khac |
| 5,731,407 A | 3/1998 | Le-Khac |
| 5,798,431 A | 8/1998 | Brahm et al. |
| 5,914,383 A | 6/1999 | Richter et al. |
| 9,376,403 B2 | 6/2016 | Halpaap et al. |
| 9,850,338 B2 | 12/2017 | Richter |
| 2004/0006228 A1 | 1/2004 | Brahm et al. |
| 2005/0033006 A1 | 2/2005 | Kocher et al. |
| 2011/0046300 A1 | 2/2011 | Brahm et al. |
| 2013/0023659 A1 | 1/2013 | Mangelschots et al. |

OTHER PUBLICATIONS

Laas et al., "Zur Synthese aliphatischer Polyisocyanate—Lackpolyisocyanate mit Biuret-, Isocyanurat-oder Uretdionstruktur" [On the synthesis of aliphatic polyisocyanates/paint polyisocyanates with biuret, isocyanurate or uretdione structure] J. prakt. Chem., 336, 185-200, 1994.

International Search Report, PCT/EP2020/059375, dated Aug. 7, 2020, Authorized officer: Isaac Ojea Jimenez.

*Primary Examiner* — Rabon A Sergent
(74) *Attorney, Agent, or Firm* — John E. Mrozinski, Jr.

(57) ABSTRACT

The invention relates to a process for the preparation of polyisocyanates with dimer, trimer and/or allophanate and optionally urethane structure.

14 Claims, No Drawings

PROCESS FOR THE PREPARATION OF POLYISOCYANATES WITH DIMER, TRIMER AND/OR ALLOPHANATE AND OPTIONALLY URETHANE STRUCTURE

CROSS REFERENCE TO RELATED APPLICATIONS

This application is a national stage application under 35 U.S.C. § 371 of PCT/EP2020/059375, filed Apr. 2, 2020, which claims benefit of European Application No. 19171784.2, filed Apr. 30, 2019, and PCT/CN2019/082029, filed Apr. 10, 2019, all of which are incorporated herein by reference in their entireties.

Polyisocyanates with a low monomer content prepared by oligomerization have been known for a long time.

In the review paper "Zur Synthese aliphatischer Polyisocyanate—Lackpolyisocyanate mit Biuret-, Isocyanurat-oder Uretdionstruktur" [On the synthesis of aliphatic polyisocyanates/paint polyisocyanates with biuret, isocyanurate or uretdione structure] (Laas, Halpaap, Pedain, J. prakt. Chem., 336, 185-200, (1994)), oligomerization reactions (e.g., trimerization reactions) of excess amounts of diisocyanates or mixtures under catalysis, subsequent termination of the reaction and distillative workup of the reaction mixture, still containing starting diisocyanate, are described. By suitable selection of the catalyst, relatively small amount of catalyst are necessary; however, all additives, such as catalyst, catalyst diluent, cocatalyst, stopper, etc, lead to byproducts which, in the recovery of the unconverted starting diisocyanates and in the product, cause problems such as solid formation, discolouration, instability, etc.

In the catalysed oligomerizations, such as trimerization, dimerization or allophanatization, a reaction does not start directly after addition of catalyst. The system exhibits a more or less lengthy incubation time, in which first suitably active entities have to be formed from catalyst and cocatalysts or diluent, or from the diisocyanate and catalyst, in order to start a noticeable reaction. This is undesirable from a process engineering viewpoint and reduces the space/time yield.

All isocyanate oligomerizations exhibit a markedly exothermic behaviour which means, from a process engineering viewpoint, that the reaction mixture, which is heated up and controlled in temperature, has to be strongly cooled after the reaction has started. Dissipating the heat represents a problem, especially in large batch reactions. It is accordingly sought, by rapid reduction in the amount of catalyst added, to minimize the reaction rate, which in turn reduces the space/time yield. In addition, the resulting fluctuations in temperature influence the quality (e.g. composition) of the polyisocyanate products prepared.

US 2011/0046300 A1: Describes the special case of a continuous preparation of polyisocyanates containing biuret structures, in which a reorganization (rebiuretization) of the urea and biuret structures first of all produced takes place with the isocyanate added in the 2nd stage. Such a procedure is not possible for the substantially stabilized trimer structures.

US 2013/0023659 A1: Describes blending products based on MDI without a reaction of the MDIs used in the 2nd stage and without distillative separation of excess monomer.

US 2004/0006228 A1: Describes the trimerization of TDI and the addition of additional TDI towards the end of the actual trimerization reaction for the purpose of minimizing the monomer content. It concerns a special modification, applicable to TDI products, of the monomer content without influence on the other general properties of the product produced.

WO 2015/124504: Describes, in Experiment 2, the trimerization of HDI. Distillatively recovered HDI is, together with fresh HDI product, initially introduced and then trimerized with addition of a catalyst. The influence of the reaction temperature on the quality of the products, and also the from time to time very strong fluctuations in temperature, are described.

The aim was to reduce the proportion of catalyst necessary, to largely get round the incubation time (to save reaction time) and to combat the great development of heat with the accompanying strong fluctuations in temperature.

This object was achieved by the process described below.

A subject-matter of the invention is a process for the preparation of polyisocyanates with dimer, trimer and/or allophanate and optionally urethane structure, in which
  a) an isocyanate component A, consisting of
    ≥70% to ≤100% by weight of one or more diisocyanates and of
    ≥0% to ≤30% by weight of one or more monoisocyanates and/or one or more isocyanates with a functionality of isocyanate groups >2
  b) optionally with an isocyanate-reactive component B, and
  c) in the presence of one or more catalysts C
is oligomerized with formation of dimer, trimer and/or allophanate structures and optionally urethane structures (I), the reaction is thermally and/or chemically interrupted (II) and optionally the polyisocyanate obtained is freed from excess isocyanate of the component A down to <1% by weight, preferably ≤0.5% by weight (III), characterized in that
  a first portion of the isocyanate component A is initially introduced into a reactor ($A_1$) and the second portion of the isocyanate component A is added to the reactor ($A_2$) in at least one metering after the beginning of the addition of catalyst, however before ≤50%, preferably ≥5% to ≤50%, particularly preferably ≥5% to ≤40%, very particularly preferably ≥5% to ≤30%, of the isocyanate groups available from component $A_1$ are oligomerized,
  and that the isocyanate component $A_1$, in comparison with the isocyanate component $A_2$, differs with regard to
    i) the temperature, viewed at the moment of the beginning of the addition of catalyst, and/or
    ii) the oligomerization activity.

In one embodiment, a subject-matter of the invention is a process for the preparation of polyisocyanates with
  dimer and/or trimer structure, in which
    a) an isocyanate component A, consisting of
      ≥70% to ≤100% by weight of one or more diisocyanates and of
      ≥0% to ≤30% by weight of one or more monoisocyanates and/or one or more isocyanates with a functionality of isocyanate groups >2
    b) in the presence of one or more catalysts C
  is oligomerized with formation of dimer and/or trimer structures (I), the reaction is thermally and/or chemically interrupted (II) and optionally the polyisocyanate obtained is freed from excess isocyanate of the component A down to <1% by weight, preferably ≤0.5% by weight (III), characterized in that
    a first portion of the isocyanate component A is initially introduced into a reactor ($A_1$) and the second portion of the isocyanate component A is added to the reactor ($A_2$) in at least one metering after the beginning of the addition of catalyst, however before ≤50%, preferably ≥5% to ≤50%, particularly preferably ≥5% to ≤40%, very particularly preferably ≥5% to ≤30%, of the isocyanate groups available from component $A_1$ are oligomerized, and that the isocyanate component $A_1$, in comparison with the isocyanate component $A_2$, differs with regard to
i) the temperature, viewed at the moment of the beginning of the addition of catalyst, and/or
ii) the oligomerization activity.

In an additional embodiment, a subject-matter of the invention is a process for the preparation of polyisocyanates with allophanate and optionally urethane structure, in which
a) an isocyanate component A, consisting of
≥70% to ≤100% by weight of one or more diisocyanates and of
≥0% to ≤30% by weight of one or more monoisocyanates and/or one or more isocyanates with a functionality of isocyanate groups >2
b) with an isocyanate-reactive component B, and
c) in the presence of one or more catalysts C is oligomerized with formation of allophanate structures and optionally urethane structures (I), the reaction is thermally and/or chemically interrupted (II) and optionally the polyisocyanate obtained is freed from excess isocyanate of the component A down to <1% by weight, preferably ≤0.5% by weight (III), characterized in that a first portion of the isocyanate component A is initially introduced into a reactor ($A_1$) and the second portion of the isocyanate component A is added to the reactor ($A_2$) in at least one metering after the beginning of the addition of catalyst, however before ≤50%, preferably ≥5% to ≤50%, particularly preferably ≥5% to ≤40%, very particularly preferably ≥5% to ≤30%, of the isocyanate groups available from component $A_1$ are oligomerized, and that the isocyanate component $A_1$, in comparison with the isocyanate component $A_2$, differs with regard to
i) the temperature, viewed at the moment of the beginning of the addition of catalyst, and/or
ii) the oligomerization activity.

In a third embodiment, a subject-matter of the invention is a process for the preparation of polyisocyanates with dimer and/or trimer structure and
allophanate and optionally urethane structure, in which
a) an isocyanate component A, consisting of
≥70% to ≤100% by weight of one or more diisocyanates and of
≥0% to ≤30% by weight of one or more monoisocyanates and/or one or more isocyanates with a functionality of isocyanate groups >2
b) with an isocyanate-reactive component B, and
c) in the presence of one or more catalysts C is oligomerized with formation of dimer and/or trimer structures and allophanate and optionally urethane structures (I), the reaction is thermally and/or chemically interrupted (II) and optionally the polyisocyanate obtained is freed from excess isocyanate of the component A down to <1% by weight, preferably ≤0.5% by weight (III), characterized in that a first portion of the isocyanate component A is initially introduced into a reactor ($A_1$) and the second portion of the isocyanate component A is added to the reactor ($A_2$) in at least one metering after the beginning of the addition of catalyst, however before ≤50%, preferably ≥5% to ≤50%, particularly preferably ≥5% to ≤40%, very particularly preferably ≥5% to ≤30%, of the isocyanate groups available from component $A_1$ are oligomerized, and that the isocyanate component $A_1$, in comparison with the isocyanate component $A_2$, differs with regard to
i) the temperature, viewed at the moment of the beginning of the addition of catalyst, and/or
ii) the oligomerization activity.

In the context of the present invention, the term "oligomerization (reaction)" encompasses the dimerization, trimerization, allophanatization and urethanization of isocyanates. The trimerization encompasses both the asymmetric (isocyanurates) and the symmetric trimerization (iminooxadiazinediones).

In the context of the present invention, reactor means any reaction vessel.

If not more fully explained, the % yield refers to the % by weight and the ppm yield to ppm by weight.

The differences between the initially introduced isocyanate component $A_1$ and the isocyanate component to be metered in $A_2$ are essential according to the invention, which differences are shown in
i) a different temperature at the moment of the beginning of the addition of catalyst, and/or
ii) a different oligomerization activity.

Temperature Difference (i)):

The temperature difference between the initially introduced isocyanate component $A_1$ and the isocyanate component to be metered in $A_2$, viewed at the moment of the beginning of the addition of catalyst, amounts to ≥25° C., preferably ≥30° C. and particularly preferably ≥40° C.

Large temperature differences from high initial charge temperature to low addition temperature are advantageous, in order thus to adjust the reaction rate and to counteract the development of heat through the exothermicity. The initially introduced component $A_1$ can be preheated before the beginning of the reaction. Component $A_2$ is then metered in with markedly lower temperature.

Different Oligomerization Activity (ii)):

The difference in the oligomerization activity of the isocyanate component $A_1$ or A2 results first from the different contents of deactivating components in the two isocyanate components. Mention may be made here, for example, of chloro- or bromocarbonyl compounds and isocyanide dichlorides of the corresponding isocyanates. Examples for this are saturated or unsaturated azepines or pyridines, such as 2,3,4,5-tetrahydro-1H-azepine-1-carbonyl chloride, 2-chloro-4,5,6,7-tetrahydro-1H-azepine-1-carbonyl chloride, 1,2,3,4-tetrahydropyridine-1H-carbonyl chloride, 6-chloro-1,2,3,4-tetrahydropyridine-1-carbonyl chloride or N-piperidinecarbonyl chloride.

In addition, different contents of acidic chlorine (AC) or of hydrolysable chlorine (HC) in the isocyanate components $A_1$ or $A_2$ also have an influence on the oligomerization activity thereof.

The content of deactivating components in the two isocyanate components can theoretically be determined by GC methods. The AC or HC contents can theoretically be determined by acidity potentiometric titration after making up or hydrolysable chlorine potentiometric titration after making up. Admittedly, the last two methods mentioned are in particular not sufficiently exact with additional impurities present.

Accordingly, the determination of the oligomerization activity of the isocyanate components $A_1$ and $A_2$ according to the present invention is carried out through activity tests which can be carried out according to the following instructions:

60 g of isocyanate $A_1$ are initially introduced into a 100 ml 2-necked flask with a magnetic stirrer, thermometer and vacuum connection, heated up with an oil bath to 60° C. and evacuated for 15 minutes. Subsequently, the vacuum is broken with nitrogen and a dropping funnel with a pressure equalizer and a drying tube and which is filled with catalyst C is installed Immediately afterwards, the dropwise metering of the catalyst is begun. The consumption of the catalyst (in g) is measured up to the moment at which the temperature of the reaction mixture begins to climb (the beginning of the rise in the temperature is in the context of the present invention defined as the moment at which the temperature is approximately 1° C. higher than the temperature at the moment of the beginning of the addition of catalyst). The experiment is carried out analogously with isocyanate component $A_2$, in which the catalyst is added with an identical metering rate. The isocyanate component with the higher or lower oligomerization activity can be determined from the comparison of the amounts of the catalyst consumed in the two experiments. The activity is higher as the amount of catalyst consumed becomes lower.

The same catalyst or the same catalyst mixture is used in carrying out the activity tests as subsequently in carrying out the process according to the invention, thus catalyst component C. The catalyst or the catalyst mixture C can be present dissolved in solvents or reactive compounds, as explained in the description of component C.

Benzyltrimethylammonium hydroxide is preferably used as catalyst C for the trimerization of HDI, IPDI and PDI in the activity test and the process according to the invention.

With the isocyanate components $A_1$ or A2 to be used in the process according to the invention, the amount of catalyst consumed with the less active component should be approximately ≥5% by weight, preferably ≥10% by weight, particularly preferably ≥20% by weight, very particularly preferably ≥40% by weight, higher than with the more active component.

Preferably, the isocyanate component with the lower oligomerization activity is used as component $A_2$.

Isocyanates from different manufacturers or production conditions can exhibit different oligomerization activities. According to process stage III of the process according to the invention, the polyisocyanate obtained from process stage II is freed from excess isocyanate of the component A. The isocyanate thus recovered exhibits for the most part one other oligomerization activity than the corresponding isocyanate originally used in process stage I. The oligomerization activity of the recovered isocyanate is for the most part substantially increased in comparison with that of the isocyanate originally used. In a preferred embodiment, recovered isocyanate from process stage III of a preceding synthesis is accordingly initially used as component $A_1$ and fresh product, i.e. isocyanate, corresponding to that which was already metered out in the preceding synthesis as component $A_2$, is also metered out here as component $A_2$.

In an additional preferred embodiment, different diisocyanates from $A_2$, chosen, e.g., from HDI, IPDI and PDI, are used in component $A_1$. Particularly preferably, however, the same diisocyanate is used.

In a very particularly preferred embodiment, the same diisocyanate with different oligomer activity and/or with different temperature is used in component $A_1$ and $A_2$. The diisocyanate is preferably HDI, IPDI or PDI.

In an alternative very particularly preferred embodiment, the same diisocyanate is used each time in component $A_1$ or $A_2$ as product recovered from process stage III (component $A_1$) and as fresh product. The diisocyanate is preferably HDI, IPDI or PDI.

Process Stage I

The process according to the invention can be carried out without or with addition of the isocyanate-reactive component B.

In the first case, depending on the reaction conditions chosen, polyisocyanates with dimeric and/or trimeric structure are formed. The reaction conditions to be chosen are known to a person skilled in the art and are described, for example, in the review paper "Zur Synthese aliphatischer Polyisocyanate—Lackpolyisocyanate mit Biuret-, Isocyanurat-oder Uretdionstruktur" (Laas, Halpaap, Pedain, J. prakt. Chem., 336, 185-200, (1994)).

When component B is used, depending on the reaction conditions, polyisocyanates with allophanate structures or with allophanate structures and trimeric and/or dimeric structures are produced. Optionally, the allophanatization reaction of the component B terminates incompletely, i.e. urethane groups survive in the allophanatization reaction of the component B. In this case, in addition to the allophanate groups, urethane groups are then also available in the polyisocyanate produced.

Catalysts can be used for the allophanatization, dimerization and trimerization. The previous addition of suitable additives, such as stabilizers, may optionally be sensible for the control of the catalyst selectivity. For example, when allophanatization is desired, acidic components may repress a trimer formation which runs simultaneously. Dibutyl phthalate or methylated compounds, such as, e.g., methyl toluenesulfonate, which further down in "Process stage II" are listed as catalyst poisons, can be used as such stabilizers. For the purpose of stabilization, these compounds are used in markedly smaller amounts than when used as catalyst poison.

In the process according to the invention, even isocyanates exhibiting urethane and/or already allophanate groups can be initially introduced (component $A_1$) or be added (component $A_2$). Urethane groups may survive in the allophanatization reaction of the isocyanates comprising urethane groups, so that, in addition to the allophanate groups, urethane groups are then also available in the polyisocyanate produced.

Should urethane groups in addition to allophanate groups be present in the polyisocyanate produced, the proportion of the urethane groups to the total amount of urethane and allophanate groups thus amounts to preferably ≤30% by weight, particularly preferably less than 20% by weight, very particularly preferably less than 10% by weight.

Isocyanate Component A

Isocyanate component A comprises all organic compounds exhibiting isocyanate groups and mixtures which contain at least a content of diisocyanates of 70% by weight, preferably of 80% by weight and particularly preferably of 95% by weight. Very particularly preferably, the isocyanate component contains exclusively diisocyanates, in particular only one diisocyanate being used.

Mention may be made, as isocyanates which can be used in the isocyanate component A), for example, of known per se monoisocyanates with aliphatically, cycloaliphatically, araliphatically or aromatically bonded isocyanate groups, such as, e.g., stearyl isocyanate or naphthyl isocyanate, diisocyanates with aliphatically, cycloaliphatically, araliphatically and/or aromatically bonded isocyanate groups, such as, e.g., 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 2,4'- and 4,4'-diisocyanatodicyclohexylmethane, 1-isocyanato-1-methyl-4 (3)-isocyanatomethylcyclohexane (IMCI), bis (isocyanatomethyl)norbornane, 2,4- and 2,6-diisocyanatotoluene (TDI), 2,4'- and 4,4'-diisocyanatodiphenylmethane and higher homologues, 1,5-diisocyanatonaphthalene, norbornan diisocyanate (NBDI), "dipropylene glycol diisocyanate" (isomers of 2-(2-isocyanatopropoxy)-1-propyl isocyanate, 1,1'-oxydi(2-propyl) isocyanate and 2,2'-oxydi(1-propyl) isocyanate), triisocyanates and/or higher functional isocyanates, such as, e.g., 4-isocyanatomethyl-1,8-octane diisocyanate (nonane triisocyanate), 1,6,11-undecane triisocyanate or any mixture of such isocyanate compounds.

In addition, isocyanates with iminooxadiazinedione, isocyanurate, uretdione, urethane, allophanate, biuret, urea, oxadiazinetrione, oxazolidinone, acylurea and/or carbodiimide structures based on the abovementioned isocyanates can also be used in the process according to the invention.

Any mixture of the isocyanates mentioned within the weight limits given above can be used.

Preferably, isocyanate compounds comprising aliphatically bonded isocyanate groups are used. Particularly preferably, HDI, PDI and/or IPDI are used as isocyanate component A).

Isocyanate-Reactive Component B

The isocyanate-reactive component B comprises low-molecular-weight and/or polymeric compounds comprising hydroxyl groups. All compounds comprising hydroxyl groups known to a person skilled in the art can be used, which compounds preferably exhibit a mean OH functionality $\geq 1$.

These can, for example, be low-molecular-weight monools (e.g., linear and branched $C_1$ to $C_{22}$ monools, e.g. 2-ethylhexanol), diols (e.g., 1,2-ethanediol, 1,3- or 1,2-propanediol, 1,4-butanediol), triols (e.g., glycerol, trimethylolpropane) and tetraols (e.g. pentaerythritol), polyether polyols, polyester polyols, polycarbonate polyols and also polythioether polyols. Preferred polyhydroxy compounds are substances of the abovementioned type based on polyether.

Preferably, these polyether polyols exhibit number-average molecular weights $M_n$ of 300 to 20 000 g/mol, particularly preferably 1000 to 12 000 g/mol and very particularly preferably 2000 to 6000 g/mol.

Further, they preferably have a mean OH functionality of 1.9, particularly preferably 1.95.

The OH functionality of these polyethers is in this connection preferably <6, particularly preferably <4.

Such polyether polyols are accessible in a way known per se by alkoxylation of suitable starter molecules under base catalysis or by the use of double metal cyanide compounds (DMC compounds).

Particularly suitable polyether polyols of the component B are those of the abovementioned type with a content of unsaturated end groups of less than or equal to 0.02 milliequivalents per gram of polyol (meq/g), preferably less than or equal to 0.015 meq/g, particularly preferably less than or equal to 0.01 meq/g (determination method ASTM D2849-69).

Such polyether polyols have in this connection a particularly narrow molecular weight distribution, that is a polydispersity (PD=$M_w/M_n$) of 1.0 to 1.5, and/or an OH functionality $\geq 1.9$. The polyether polyols mentioned preferably exhibit a polydispersity of 1.0 to 1.5 and an OH functionality of greater than 1.9, particularly preferably of greater than or equal to 1.95.

Such polyether polyols can be prepared in a way known per se by alkoxylation of suitable starter molecules, in particular using double metal cyanide catalysts (DMC catalysis). This is, e.g., described in U.S. Pat. No. 5,158,922 (e.g. Example 30) and EP-A 0 654 302 (p. 5, l. 26 to p. 6, l. 32).

Suitable starter molecules for the preparation of polyether polyols are, for example, simple low-molecular-weight polyols, water, organic polyamines with at least two N—H bonds, or any mixture of such starter molecules. Alkylene oxides suitable for the alkoxylation are in particular ethylene oxide and/or propylene oxide, which can be used in the alkoxylation in any sequence or else in a mixture.

Preferred starter molecules for the preparation of polyether polyols by alkoxylation, in particular according to the DMC process, are simple polyols, such as ethylene glycol, 1,3-propylene glycol and butane-1,4-diol, hexane-1, 6-diol, neopentyl glycol, 2-ethylhexane-1,3-diol, glycerol, trimethylolpropane, pentaerythritol, and also low-molecular-weight esters of such polyols with dicarboxylic acids, which esters exhibit hydroxyl groups, or low-molecular-weight ethoxylation or propoxylation products of such simple polyols, or any mixture of such polyhydroxy compounds.

The amount of the isocyanate-reactive component B to be used in the process according to the invention is at $\leq 50\%$ by weight, preferably at $\leq 30\%$ by weight, particularly preferably at $\geq 1\%$ by weight and $\leq 20\%$ by weight, very particularly preferably at $\geq 2\%$ by weight and $\leq 10\%$ by weight, based on the amount of isocyanate component A.

Component C—Catalysts

Any trimerization, dimerization and allophanatization catalyst can be used as catalysts, such as, for example, are mentioned in H. J. Laas et al., J. prakt. Chem., 336, 185-200 (1994) and the literature cited therein; EP 755 954, EP 798 299. Mention may be made, for example, as catalysts C, of: lead(II) acetate, lead(II) 2-ethylhexanoate, Mannich bases, such as, for example, a reaction product of phenol with dimethylamine, tertiary amines, such as diazabicyclo[2.2.2] octane (DABCO), N,N,N',N'-tetramethylethylenediamine, optionally in a mixture with epoxides, alkali metal and alkaline earth metal compounds, such as oxides, hydroxides, carbonates, alkoxides or phenoxides, but also metal salts of weak aliphatic or cycloaliphatic carboxylic acids, optionally in the presence of crown ethers having a complexing effect or linear polyethers. Suitable catalysts C are in addition, for example, tris(dimethylaminopropyl)hexahydrotriazine (®Polycat 41, manufacturer: Air Products), optionally as addition compound with phenols or carboxylic acids. Highly suitable as catalysts C are quaternary ammonium compounds, such as trimethylbenzylammonium hydroxide (®Triton B, manufacturer: Merck KGaA, Germany), methylcholine or hydroxyalkylammonium carboxylates or quaternary ammonium fluorides, with counterions such as, for example, chloride, fluoride or bifluoride. In addition to the ammonium salts mentioned by way of example, corresponding phosphonium salts or phosphines can also be used as catalysts C. Aminosilanes are a further category of compounds as catalysts C, e.g. hexamethyldisilazane (HMDS).

Use may likewise be made, as catalysts C, of spirocyclic ammonium salts with a cation of the formula I

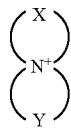
(formula I)

in which the X and Y substituents in the N position represent identical or different, substituted or unsubstituted and linear or branched $C_2$-$C_{20}$ segments, optionally interrupted by heteroatoms from the series oxygen, sulfur, nitrogen and also aromatic rings, and optionally exhibiting additional rings, and with an anion chosen from hydroxide, alkoxide, carboxylate, heterocycles with at least one negatively charged nitrogen atom in the ring, in particular azolate, imidazolate, triazolate or tetrazolate, fluoride, bifluoride, higher polyfluorides or mixtures of these.

Use may likewise be made of monocyclic ammonium salts with a cation of the formula II

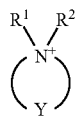
(formula II)

in which the substituents $R^1$ and $R^2$ in the N position represent, independently of each other, identical or different aliphatic, cycloaliphatic, aromatic or araliphatic $C_1$-$C_{20}$ radicals, which are saturated or unsaturated, linear or branched, optionally substituted and/or interrupted by heteroatoms from the series oxygen, sulfur and nitrogen, and Y represents a substituted or unsubstituted and linear or branched $C_2$-$C_{20}$ segment, optionally interrupted by heteroatoms from the series oxygen, sulfur, nitrogen and also aromatic rings, and optionally exhibiting additional rings, and with an anion chosen from hydroxide, alkoxide, carboxylate, heterocycles with at least one negatively charged nitrogen atom in the ring, in particular azolate, imidazolate, triazolate or tetrazolate, fluoride, bifluoride, higher polyfluorides or mixtures of these.

The catalysts are metered in optionally dissolved in solvents or reactive compounds, such as, e.g., alcohols. In this connection, the content, based on the isocyanate component A, ranges from 1 ppm by weight to 5% by weight, preferably 5 ppm by weight to 0.5% by weight and particularly preferably 10 ppm by weight to 0.1% by weight.

The metering of the catalyst can be carried out portionwise or continuously. Preferably, the catalyst is added continuously over a fairly lengthy period of time.

The metering of the catalyst can also be carried out with a metering rate suited to the progress of the reaction (rate, exothermicity).

Benzyltrimethylammonium hydroxide is preferably used for the trimerization of HDI, PDI and IPDI.

Process Stage II

According to process stage II, the oligomerization reaction is interrupted thermally and/or chemically at the end. The latter can be carried out by addition of a catalyst poison, such as, e.g., protonic acids, acid chlorides, dibutyl phthalate or methylated compounds, such as, e.g., methyl toluenesulfonate or dodecylbenzenesulfonic acid.

Process Stage III

In process stage III, the polyisocyanate obtained from process stage II is optionally freed from excess isocyanate of the component A down to <1% by weight, preferably ≤0.5% by weight.

The isocyanate recovered in this way can be reused in a following synthesis according to the invention. Preferably, it is then used as component $A_1$ in the process, i.e. initially introduced into the reactor (cf. also for this the preceding embodiments under the point "Different oligomerization activity (ii)", use of fresh product and recovered isocyanate).

The products or product mixtures obtainable according to the process according to the invention consequently represent starting materials which have many uses in the preparation of optionally foamed plastic(s) and also paints, coating compositions, adhesives and additives.

The process products according to the invention can be used pure or in combination with other isocyanate derivatives of the state of the art, such as, e.g., polyisocyanates comprising uretdione, biuret, allophanate, isocyanurate and/or urethane groups, the free NCO groups of which have optionally been deactivated with blocking agents.

The comparative examples and examples which follow are intended to further illustrate the invention but without limiting it.

EXAMPLES

All percentages are based on weight, unless stated otherwise.

The following compounds were used:
Desmodur® H: hexamethylene diisocyanate (HDI) from Covestro AG, Leverkusen, Germany
Triton® B: benzyltrimethylammonium hydroxide from Merck KGaA, Darmstadt, Germany
2-ethylhexanol: Sigma-Aldrich Chemie GmbH, Taufkirchen, GER
dibutyl phosphate: Sigma-Aldrich Chemie GmbH, Taufkirchen, GER Determination Methods:
The NCO contents were determined by titrimetric means according to DIN EN ISO 11909 (2007-05).

The residual monomer contents were measured according to DIN EN ISO 10283 (2007-11) by gas chromatography with an internal standard.

The dynamic viscosities were determined at 23° C. using the VT 550 viscometer from Haake. By measurements at different shear rates, it was ensured that the flow behaviour of the polyisocyanate mixtures described according to the invention and also that of the comparative products corresponds to that of ideal Newtonian fluids. The indication of the shear rate can therefore be omitted.

Activity test on the ability of the isocyanate component to oligomerize: according to embodiments in the descriptive part. Catalyst: 1% benzyltrimethylammonium hydroxide solution in 2-ethylhexanol (benzyltrimethylammonium hydroxide from Aldrich).

Comparative Example (Following WO 2015/124504):
700 g of fresh hexamethylene diisocyanate (HDI, content: 99.7% (GC)) are mixed with 980 g of recycled HDI distillate (from a preceding identical batch in which exclusively fresh HDI was used, content: 98.2% according to GC) in a dry 2-1 four-necked flask with a stirrer, dropping funnel, vacuum connection and drying tube, heated to 60° C. and briefly evacuated twice. After the respective breaking of the vacuum and the inerting with nitrogen, catalyst (0.5% benzyltrimethylammonium hydroxide in 2-ethylhexanol) was slowly added dropwise via a dropping funnel. After approximately 30 minutes, 10 g of catalyst were consumed. The incipient trimerization led to a marked exothermicity. In spite of interrupting the addition of catalyst, the temperature quickly rose further to over 72° C. The metering remained interrupted and the reaction vessel was additionally cooled with a water bath (18° C.). After the reaction temperature had fallen to 62° C., the catalysis was continued markedly slowed down in 0.7-0.8 g portions. The further development of heat could be brought under control using water bath cooling. Thus, the temperature could be maintained between 60 and 68° C.

The reaction was monitored through sampling and NCO content measurement. After 3.5 hours, the reaction was terminated at an NCO content of 39.5% by addition of dibutyl phosphate (50 equimolar % with regard to the total amount of catalyst used of 16 g) and the reaction mixture was stirred at 60° C. for a further 1 h.

The crude product thus obtained was worked up in a glass molecular evaporator with an upstream pre-evaporator (pre-evaporation: 145° C., main evaporation: 135° C., 0.2 mbar).

A faintly yellow clear polyisocyanate with a monomer content of 0.25% residual HDI was obtained.

Further characteristics: NCO content: 21.7%, viscosity: 3120 mPa·s (23° C.)

The HDI distillate recovered exhibited an HDI content (GC) of 98.4%. The AC content was 2 ppm.

Example According to the Invention:

980 g of recycled HDI distillate (from a preceding identical batch in which exclusively fresh HDI was used, content: 98.4% according to GC) initially introduced into a dry 2-l four-necked flask with a stirrer, dropping funnel, vacuum connection and drying tube, and heated to 60° C. The inerting is carried out by briefly evacuating twice. After the respective breaking of the vacuum and the inerting with nitrogen, the catalyst (0.5% benzyltrimethylammonium hydroxide in 2-ethylhexanol) was slowly added dropwise via a dropping funnel. After approximately 5 minutes, 3 g of catalyst were consumed. The incipient trimerization led to a marked exothermicity. The metering of the catalyst was kept up. The temperature could be maintained at approximately 64° C. by continuous addition of 700 g of cold (AT) fresh HDI (according to activity test approximately half as active as the recycled HDI distillate). Surprisingly, however, the reaction does not come to a standstill through the addition. After 40 min, the stock of fresh HDI was consumed. The further metering of catalyst and the trimerization reaction associated therewith could be maintained by water bath cooling within a range of 60 to 65° C. After each noticeable decline in reaction, the catalysis was continued through respective addition of catalyst (in portions of 0.7-0.8 ml).

The reaction was monitored through sampling and NCO content measurement. After 2.75 hours, the reaction was terminated at an NCO content of 39.7% by addition of dibutyl phosphate (50 equimolar % with regard to the total amount of catalyst used of 12 g) and the reaction mixture was stirred at 60° C. for a further 1 h.

The crude product thus obtained was worked up in a glass molecular evaporator with an upstream pre-evaporator (pre-evaporation: 145° C., main evaporation: 135° C., 0.2 mbar).

A largely colourless clear polyisocyanate with a monomer content of 0.28% residual HDI was obtained.

Further characteristics: NCO content: 21.8%, viscosity: 3030 mPa·s (23° C.)

The HDI distillate recovered exhibited an HDI content (GC) of 98.7%. The AC content was 2 ppm.

The advantages of the new process are obvious, through the initially moderate exothermicity behaviour (saving of cooling energy through use of the low temperature of the fresh HDI), the clearly reduced incubation time combined with a lower total reaction time and the altogether lower amount of initiator and accordingly of stopper.

The invention claimed is:

1. Process for the preparation of polyisocyanates with dimer, trimer and/or allophanate and optionally urethane structure, in which
   a) an isocyanate component A, consisting of
      ≥70% by weight to ≤100% by weight of one or more diisocyanates with aliphatically, cycloaliphatically, araliphatically and/or aromatically bonded isocyanate groups and of
      ≥0% by weight to ≤30% by weight of one or more monoisocyanates with aliphatically, cycloaliphatically, araliphatically and/or aromatically bonded isocyanate groups and/or one or more isocyanates with aliphatically, cycloaliphatically, araliphatically and/or aromatically bonded isocyanate groups and with a functionality of isocyanate groups >2
   b) optionally with an isocyanate-reactive component B, is oligomerized in the presence of one or more catalysts C with formation of dimer, trimer and/or allophanate structures and optionally urethane structures (process stage I), the oligomerization reaction is thermally and/or chemically interrupted (process stage II) and optionally the polyisocyanate obtained is freed from excess isocyanate of the component A down to <1% by weight (process stage III), characterized in that
   a first portion of the isocyanate component $A_1$ is initially introduced into a reactor and a second portion of the isocyanate component $A_2$ is added to the reactor in at least one metering after beginning of the addition of one or more catalysts C, however before ≤50% of the isocyanate groups available from component $A_1$ are oligomerized,
   and that the first portion of the isocyanate component $A_1$, in comparison with the second portion of the isocyanate component $A_2$, differs with regard to
   i) the temperature, viewed at the beginning of the addition of the one or more catalysts C, and/or
   ii) the oligomerization activity,
   wherein a difference in oligomerization activity is determined according to an activity test comprising the steps of:
   (1) introducing 60 g of the first portion of the isocyanate component $A_1$ into a 100 ml 2-necked flask with a magnetic stirrer, thermometer and vacuum connection,
   (2) heating the 2-necked flask with an oil bath to 60° C.,
   (3) evacuating the 2-necked flask for 15 minutes to form a vacuum,
   (4) breaking the vacuum formed in (3) with nitrogen,
   (5) installing a dropping funnel with a pressure equalizer and a drying tube which is filled with one or more catalysts C,
   (6) beginning dropwise metering of the one or more catalysts C to produce a reaction mixture,
   (7) measuring consumption of the one or more catalysts C (in g) until the temperature of the reaction mixture begins to climb,
   (8) repeating the activity test with the second portion of the isocyanate component $A_2$, in which the one or more catalysts C is added at an identical metering rate, determining a higher or lower oligomerization activity from a comparison of the amounts of the one or more catalysts C consumed in the two activity tests in which the activity is higher as the amount of catalyst consumed becomes lower, and in the activity test, the amount of catalyst consumed with the less active isocyanate component is approximately ≥5% higher than with the more active isocyanate component.

2. Process according to claim 1, in which the second portion of the isocyanate component $A_2$ is added to the reactor in at least one metering after beginning the addition of the one or more catalysts C, before ≥5% to ≤50% of the NCO groups available from the first portion of the isocyanate component $A_1$ are oligomerized.

3. Process according to claim 1, in which the second portion of the isocyanate component $A_2$ is added to the reactor in at least one metering after the beginning the addition of the one or more catalysts C, before ≥5% to ≤40% of the NCO groups available from the first portion of the isocyanate component $A_1$ are oligomerized.

4. Process according to claim 1, in which the temperature difference between the first portion of the isocyanate component $A_1$ initially introduced and the second isocyanate component $A_2$ to be metered in, measured at the beginning of the addition of the one or more catalysts C, is ≥25° C.

5. Process according to claim 1, in which, at the beginning of the addition of the one or more catalysts C, the temperature of the first portion of the isocyanate component $A_1$ initially introduced is higher than the temperature of the second portion of the isocyanate component $A_2$ to be metered in.

6. Process according to claim 1, in which the second portion of the isocyanate component $A_2$ is the less active and the first portion of the isocyanate component $A_1$ is the more active.

7. Process according to claim 1, in which isocyanate recovered from process stage III is introduced in a subsequent process as the first portion of the isocyanate component $A_1$ and fresh isocyanate is metered in as the second portion of the isocyanate component $A_2$.

8. Process according to claim 1, in which diisocyanates with aliphatically and/or cycloaliphatically bonded isocyanate groups are used in component A.

9. Process according to claim 1, in which exclusively diisocyanates are used in component A.

10. Process according to claim 1, in which different isocyanates from the second portion of the isocyanate component $A_2$ are used in the first portion of the isocyanate component $A_1$.

11. Process according to claim 9, in which the diisocyanates are chosen from 1,6-diisocyanatohexane (HDI), 1-isocyanato-3,3,5-trimethyl-5-isocyanatomethylcyclohexane (IPDI) and 1,5-diisocyanatopentane (PDI).

12. Process according to claim 1, in which the same diisocyanate is used in the first portion of the isocyanate component $A_1$ and the second portion of the isocyanate component $A_2$.

13. Process according to claim 12, in which 1,6-diisocyanatohexane (HDI), 1-isocyanato-3,3,5-trimethyl-5-isocyanatomethylcyclohexane (IPDI) or 1,5-diisocyanatopentane (PDI) is used.

14. Process according to claim 1, in which an isocyanate-reactive component B is used.

* * * * *